Patented Oct. 19, 1943

2,331,926

UNITED STATES PATENT OFFICE 2,331,926

RESINOUS CONDENSATION PRODUCT AND MANUFACTURE THEREOF

John F. Olin, Grosse Ile, Mich., assignor to Sharples Chemicals Inc., a corporation of Delaware No Drawing. Application March 29, 1941, Serial No. 385,857

17 Claims. (Cl. 260—69)

The present invention pertains to a new class of synthetic resins and related condensation products, and to the manufacture of such new compositions of matter. The products of the invention are useful as film forming constituents of coating compositions, impregnating and stiffening agents for fabrics, molding compositions, adhesives, agents for the coating and sizing of paper, and for a wide variety of other techincal uses. They may be either solid resins or viscous liquid condensation products which are closely analogous to the solid resins, and they will be referred to hereinafter by the generic term of "resinous condensation products."

Resinous condensation products of the type formed by condensation of urea with formaldehyde have found wide use in industry, but their commercial utilization has been limited because of the instability of these products and their lack of solubility in water. In many industrial applications such as those suggested above, a water-soluble resinous condensation product is desirable. The familiar urea-formaldehyde condensation products are soluble in water only during the initial stages of the condensation reaction. While attempts have been made to use these products in this incomplete state of condensation in cases in which a water-soluble condensation product is desired, serious difficulties have been encountered in this connection because of the instability of these initial condensation products. When aqueous solutions of these products are allowed to stand for a short time, white precipitates or gels are formed, thereby rendering the product practically useless. Another objection to the use of these partial condensation products consists in the fact that further condensation tends to proceed after application of the product in a coating composition, for example. These products are obtained in a condensation reaction in which the temperature does not ordinarily exceed 100° C. If a coating film is made of such a product, and heat is applied to set the coating, the application of this heat results in further condensation and liberation of objectionable formaldehyde fumes.

Objects of the present invention have been to provide a new class of condensation products between urea derivatives and formaldehyde and its equivalents, which is free of the above-noted defects.

More specifically, an object of the present invention has been to provide relatively stable water-soluble resinous condensation products between formaldehyde and its equivalents, and urea derivatives.

A further object of the invention consists in the desire to produce a condensation product of the above-mentioned type which may be set by the application of heat, in cases in which this thermosetting characteristic is desired.

A still further object of the invention consists in the desire to produce resins of this type which may be dissolved in aromatic hydrocarbons, alcohols and other organic solvents, in cases in which such solubility characteristics are desired.

Still further objects, and the manner in which the above and these further objects have been attained, will be evident from the following more detailed description of the invention.

It is possible, by the technique of the invention described in my co-pending application, Serial No. 278,175, filed June 9, 1939, now Patent No. 2,253,528, for Manufacture of derivatives of urea, to produce compounds having alkylol radicals substituted for one or more of the hydrogen atoms attached to the nitrogen atoms of urea. Thus, in accordance with Example 3 of that application, 16.3 mols of ethylolamine and 16.3 mols of urea were mixed in a two-necked flask and agitated during the course of a run by means of a mercury sealed stirrer. Heat was applied to the mixture until the temperature reached 130° C., and ammonia was discharged from the reaction mixture through a reflux column and ammonia scrubber. After approximately two hours the theoretical quantity of ammonia had been evolved. Upon cooling, there was left in the flask a crude solution of beta-hydroxyethyl urea. The crude product was a viscous, straw-colored liquid, having a specific gravity at 28° C. of 1.270. A titration showed that it contained only 0.22% alkalinity determined as free ethylolamine. This product consisted principally of the mono-N-beta-hydroxyethyl urea contaminated with but a small proportion of other constituents and was of sufficient purity for use in the process of the present invention. A relatively pure hydroxyethyl urea crystallizes from the product upon standing, and this product has a melting point of approximately 90° C. This purified product may be substituted for the crude one in the practice of the present invention, if desired.

By a procedure analogous to that described above, the various alkylolureas may be produced, by a proper choice of the alkylolamine to be condensed with urea and of the proportion of alkylolamine to urea. Thus, by condensing diethylolamine with urea, unsymmetrical diethylolurea may be obtained, and by condensing two mols of ethylolamine with urea, symmetrical diethylolurea may be obtained. Similarly, the corresponding propylol-, butylol-, pentylol-, hexylol-, etc., ureas may be obtained by choice of the appropriate alkylolamine for condensation with urea and proper regulation of proportions to effect substitution of one or more alkylol radicals for the hydrogen atoms of the urea molecule, as desired.

In the condensation of alkylolamines with urea as described above, a number of compounds are produced in addition to the alkylolureas. Thus, a mixture containing products A to E of the following equations may be produced by condensing a dialkylolamine with urea, by reaction of the hydrogen and/or alkylol groups of the amines with urea. The relative proportions of these products are dependent upon the proportions of the reactants, as indicated by the equations.

FROM DIALKYLOLAMINES

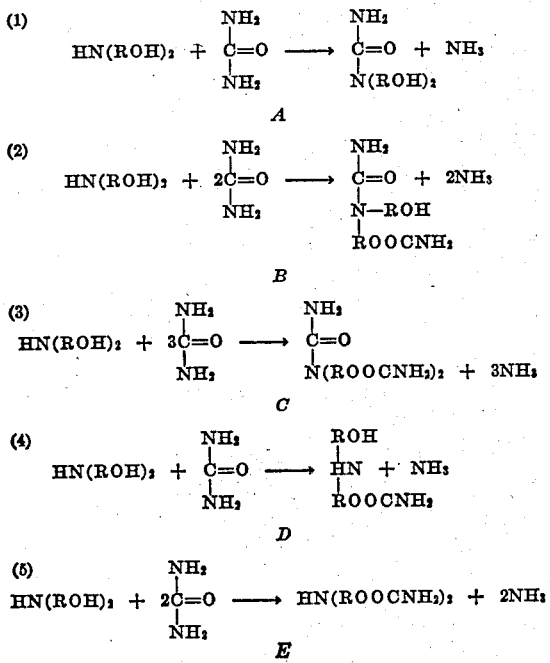

When a mono-alkylolamine is condensed with urea, the resulting mixture may also include a variety of urea derivatives, as follows (Compounds F, G and H, below):

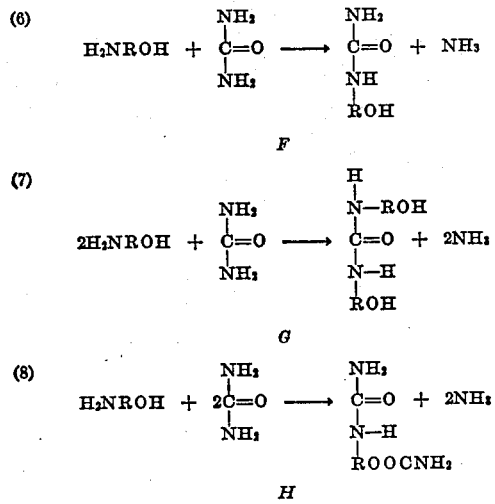

The present invention rests upon the discovery that a valuable and new class of resinous condensation products may be obtained by condensation of formaldehyde or its equivalents with urea derivatives obtained by condensation of urea with mono- and di-alkylolamines. In the preferred practice of the invention, alkylolamines having between two and six carbon atoms are employed in producing the urea derivatives to be condensed with formaldehyde. These urea derivatives may be condensed with formaldehyde or other methylene containing body in the same manner as that familiar to those skilled in the art in the preparation of the familiar urea-formaldehyde resins. Thus, when the crude reaction mixtures or purified hydroxyalkylureas discussed above, are condensed with formaldehyde with or without an acid, basic or neutral catalyst, resins having very valuable technical characteristics, as discussed above, are obtained. In the practice of this condensation, the reaction mixture is preferably heated to speed up the reaction. These resins have the valuable water-solubility characteristics discussed above in connection with the initial condensation products of simple urea and formaldehyde, but they do not have the serious drawback of instability of these previously known resinous condensation products.

A further advantage of the resinous condensation products of the present invention, in addition to their stability, consists in the fact that they may be made to have thermosetting or thermoplastic characteristics, depending upon the use to which the condensation product is to be put, by observance of appropriate conditions. By mixing the urea derivatives with a relatively small proportion of simple urea, biruet or melamine, and condensing the resulting mixture with formaldehyde, a solid thermoplastic resin may be obtained, which is harder than the product obtainable when the simple urea is omitted. When beta-hydroxyethyl- or other hydroxyalkyl-urea, for example, is condensed with formaldehyde in the presence of at least 10% of urea by heating to a temperature of 140° C., a resinous condensation product is obtained which sets to form a hard solid coating upon cooling. In this connection, it should be observed that a similar result can be attained by combining a small amount of the preliminary condensation product of urea and formaldehyde with the partially condensed product from the urea derivative and formaldehyde, and completing the condensation of these products by heating the two partial condensation products together. If a viscous liquid condensation product is desired, on the other hand, the urea derivative may be combined with an alkyl urea to produce a resinous condensation product having more fluid characteristics than would be obtainable if the alkyl urea were omitted.

The modifications of procedure for causing these resins to assume various physical forms are relatively simple. For example, the water soluble thermoplastic type is obtained in cases where the urea derivative and simple urea, in quantity not sufficient to cause gellation, are reacted with formaldehyde in the presence of volatile organic acid catalysts. Thermosetting resins may be obtained simply by the addition of a non-volatile acid to the resins just described, or to the urea derivative prior to condensing it with formaldehyde. In order to obtain thermosetting resins, however, at least a small amount of simple urea should be present. The organic solvent-soluble resins are produced by conducting the initial and/or final resinification in the presence of hydroxyl containing substances such as butanol.

Valuable resins having the property of solubility in aromatic hydrocarbons, alcohols and other organic solvents may be obtained in the practice of the invention by conducting the condensation reactions between the methylene-containing body and the urea derivative in the presence of a suitable organic solvent, such as an alcohol. Thus, when butyl alcohol is added to the mixture of alkylol urea with formaldehyde, for example, either before the heating is commenced, or after the mixture has been heated for a time to effect preliminary condensation, the final product of the reaction will be a resinous condensation product which is soluble in various organic media, and can thus be conveniently applied as a protective coating or plasticizer in lacquers, varnishes and other coating compositions. It may also be used as a plasticizer for molding compounds.

While the condensation products of the present invention may be produced by heating the reactants in the presence of an acid, basic or neutral catalyst, or indeed without any catalyst at all, best results in the practice of the invention have been obtained by the use of organic acids as catalysts, formic, and acetic acids being preferred. In case a thermosetting resin is desired, lactic acid may be used as the catalyst. In this connection the desired thermosetting characteristic may be attained by substituting lactic acid for the lower molecular weight acid in the condensation reaction, or by conducting the condensation reaction with the aid of the lower acid, and adding the lactic acid to the solution of the condensation product forming the coating composition in order to convert this product to the thermosetting form upon baking.

The following examples illustrate the process and products of the invention:

EXAMPLE I 240 parts of N-beta-hydroxethylurea, 240 parts of 37% aqueous formaldehyde solution and 15 parts of a 93% solution of acetic acid were placed in a vessel equipped with an agitator and heated to 130° C. until substantially all of the water was removed. The resulting resinous condensation product was a viscous liquid at the temperature of 130° C., but solidified upon cooling, and was found to have a melting point of 46° C. by the ring and ball method. This resinous condensation product was thermoplastic, unusually stable, water-white, and soluble in water. It was found to be compatible with other water soluble adhesive ingredients such as methyl cellulose, poly-vinyl alcohol, casein, etc. It was dissolved in distilled water to produce a liquid product of the desired consistency. The resulting aqueous solution was relatively free of formaldehyde odor, was water-white, and possessed excellent adhesive properties. When it was formed into a film and baked for one hour at 250° F. with lactic acid present as a catalyst, it was found not to undergo further condensation and it remained tacky and plastic.

EXAMPLE II 240 parts of N-beta-hydroxyethylurea, 24 parts of urea and 240 parts of 37% aqueous formaldehyde solution were condensed with the aid of acetic acid as a catalyst in the same manner discussed in Example I. The resulting condensation product was a viscous liquid at 130° C. but solidified upon cooling, and was found to have a melting point of 75° C. by the ball and ring method. It had characteristics similar to those obtained in the practice of Example I, except that it was a harder product. A solution of this resin with a small quantity of lactic acid present as a catalyst was baked for one hour at 250° F. and was found to form a thermosetting, water and alcohol resistant film, which was tough and elastic.

EXAMPLE III 240 parts of N-beta-hydroxyethylurea, 24 parts of urea and 240 parts of 37% aqueous formaldehyde solution were heated until the temperature reached 100° C. 10 parts of concentrated hydrochloric acid were then added. The partially condensed resin gelled immediately. This gel was dried in an oven overnight at a temperature of 125° F. and then comminuted and molded at 95° C. under 5000 lbs. pressure for 30 minutes. The button resulting from this molding operation was a clear, glass-like, tough and elastic product, and was found to be strongly resistant to attack by organic solvents and water.

EXAMPLE IV 35 parts of unsymmetrical diethylolurea (obtained by condensation of diethanolamine with urea), 15 parts of urea, 50 parts of 37% aqueous formaldehyde solution and one part of acetic acid of 93% concentration were heated in an open vessel and agitated during the heating operation until virtually all of the water was driven off (temperature, 130° C.). The product was a viscous liquid at this temperature but solidified on cooling and was found to have a melting point of 46.5° C. by the ball and ring method. The resin was soluble in water, and aqueous solutions were found to be stable, water-white, and to produce a thermosetting film when baked for one hour with a small quantity of phosphoric acid at a temperature of 250° F., to yield a hard, tough, elastic, film.

EXAMPLE V 50 parts of N-isobutylolurea, 50 parts of 37% aqueous formaldehyde solution and 7 parts of 93% acetic acid were heated with agitation until the temperature reached 150° C. The resulting condensation product was found to be a water-soluble, water-white thermoplastic substance, and was stable in aqueous solutions. Films formed from such solutions, when baked for one hour at 250° F., were found to be thermoplastic.

EXAMPLE VI 30 parts of N-isobutylolurea, 113 parts of 37% aqueous formaldehyde solution, 15 parts of urea and 4 parts of 93% acetic acid were placed in an open vessel equipped with an agitator and processed in a manner similar to the reactants of Example V, except that the polymerization was carried on at a temperature of 135° C. instead of 150° C. The resulting resinous condensation product was found to have a melting point of 50° C. and was soluble in water. Aqueous solutions were stable, and water-white, and they were relatively free from formaldehyde odor.

EXAMPLE VII 37.5 parts of N-isobutylolurea, 101 parts of 37% aqueous formaldehyde solution, 12.5 parts of urea and 5 parts of 93% acetic acid were charged into a vessel equipped with a distillation take-off and an agitator. The resulting mixture was heated to a temperature of 125° C., water being removed during the heating operation. To the resulting hot resinous solution, 50 cc. of butyl alcohol were added slowly during continued stirring of the mixture. The resulting mixture was refluxed at boiling temperatures (117–125° C.)

for about one hour. As an alternative to this procedure, the butyl alcohol may be distilled overhead slowly while allowing the temperature to rise to 150° C. and then the removed butyl alcohol may be replaced with a suitable organic solvent, such as a mixture containing 40% toluene and 60% butyl alcohol. Regardless of which of the procedures discussed above is adopted, the resulting resinous product is soluble in hydrocarbons and alcohols in all proportions. It is a water-white and stable resin, and is compatible with alkyd and other resins and with nitro-cellulose solutions. Films formed from solution of these resins by addition of non-volatile acid may be caused to be thermosetting, tough and elastic. They are resistant to solvents and are not readily softened by water after being baked for one hour at 250° F.

EXAMPLE VIII 90 parts by weight of monoethylolurea, 100 parts 37% formaldehyde, 100 parts of methanol and 4 parts of 95% acetic acid were charged into a 1000 cc. beaker and heated to 50° C. 10 parts of melamine were then introduced over a period of five minutes and the heating continued until the temperature reached 110° C. The resin was now dissolved in equal weight of water to yield a clear, water-white solution. Films formed from this solution of resin are characterized, after baking for 30 minutes at 125° C., by their toughness and considerable hardness.

It will be readily understood by those skilled in the art that the above examples represent but a few of the many possibilities of application of the principles of the invention. As pointed out above and in my co-pending application Serial No. 380,669, filed February 26, 1941, the reaction between alkylolamines and urea or certain urea derivatives is a general one, and may be applied in their manufacture by the use of alkylolamines, such as ethylolamine, diethylolamine, triethylolamine, propylolamines, butylolamines, etc. Alkyl-alkylolamines such as alkyl aminoethanols, alkyl diethylolamines, and dialkyl aminoethanols may likewise be condensed with urea, as may also amino alkanediols and -triols, such as 1-amino-2,3-propanediol. Diamino alkanols such as 1,3-di-amino-2-propanol may also be condensed with urea in the general manner indicated by the above equations. All of these various reaction products resulting from condensation of the amino compounds with urea may in turn be condensed with formaldehyde to produce resins or related condensation products. The following example illustrates the manufacture of a resin from 2-ethyl-2-ureido-1,3-propanediol, this compound being obtained by condensation with urea of 1,3,dihydroxy, 2-ethyl, 2-amino propane, and having the following formula:

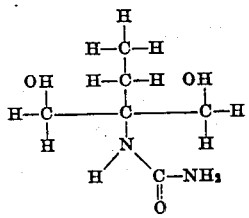

EXAMPLE IX 18 parts of 2-ethyl-2-ureido-1,3-propanediol, 2 parts of urea, 20 parts of aqueous formaldehyde solution of 37% concentration, and 0.5 part of acetic acid of 93% concentration were heated in an open vessel equipped with an agitator until the water was driven off (150° C.). At this temperature the resinous condensation product was a viscous liquid. Upon being dissolved in an equal weight of distilled water the solution was found to be water-white, stable, film-forming and thermo-plastic.

The following example illustrates the manufacture of a resinous condensation product from the condensation product between 1,3-diamino propanol and urea.

EXAMPLE X 90 grams (one mol) of pure 1,3-diaminopropanol and 120 grams (2 mols) of urea were placed in a 1 liter flask fitted with a thermometer, mercury sealed stirrer and reflux condenser, with a water scrubber attached to the end of the reflux condenser. A small amount of acetic acid catalyst was added. Upon heating the mixture, with stirring, it was observed that complete solution occurred at a temperature of about 100° C. and rapid evolution of ammonia occurred above 130° C. The reaction, as judged by the evolution of 32 grams of ammonia, was complete in ½ hour at 140–150° C. The reaction mass was poured into a tin plate while hot. Upon cooling it presented itself as a very pale colored resinous material, which was slightly tacky to the touch. This material was easily soluble in water and was believed to consist essentially of 1,3-diureido 2-propanol. Upon being condensed with formaldehyde and 10% simple urea the product was found to gel. The gel appeared to possess rather unusual properties in that it could be easily broken in the fingers. A quantity of this gel was pulverized and dried at a temperature of 80° C. overnight. The resulting powder was molded at 5000 lbs. pressure at 125° C. The resulting button was transparent and extremely hard.

Still further modifications will be obvious to those skilled in the art and I do not therefore wish to be limited except by the scope of the following claims.

The term "alkylolureas" as used in this specification and claims is intended to cover only those compounds formed by substituting for one or more hydrogen atoms of the urea molecule, an alkylol group. The term is not intended to cover such compounds as carbamylalkylureas or carbamylalklamines. Such compounds may be formed incidentally in the formation of alkylolureas and may be present when the resinification takes place, but the reaction upon which this application is based is essentially between the alkylolureas defined above and formaldehydes.

I claim:

1. As a new composition of matter, the resinous condensation product obtained by condensing an alkylolurea containing at least two carbon atoms in an alkylol radical with formaldehyde.

2. As a new composition of matter, the resinous condensation product obtained by condensing an alkylolurea containing a single alkylol radical having at least two carbon atoms with formaldehyde.

3. As a new composition of matter, the resinous condensation product obtained by condensing an alkylolurea containing two separate alkylol radicals of which each alkylol radical contains at least two carbon atoms with formaldehyde.

4. As a new composition of matter, the resinous condensation product obtained by condensing an alkylolurea containing between two and six carbon atoms in an alkylol radical with formaldehyde.

5. As a new composition of matter, the resinous condensation product obtained by condensing a mixture containing an alkylolurea containing at least two carbon atoms in an alkylol radical and a compound chosen from the class consisting of urea and biuret, with formaldehyde.

6. As a new composition of matter, the resinous condensation product obtained by condensing an alkylolurea containing at least two carbon atoms in an alkylol radical and unsubstituted urea with formaldehyde.

7. As a new composition of matter, the resinous condensation product obtained by condensing beta-hydroxyethylurea with formaldehyde.

8. As a new composition of matter, the resinous condensation product obtained by condensing an alkylolurea containing at least two carbon atoms in an alkylol radical with formaldehyde with the aid of an organic acid catalyst.

9. In the manufacture of resinous condensation products, the process comprising condensing an alkylolurea containing at least two carbon atoms in an alkylol radical with formaldehyde.

10. In the manufacture of resinous condensation products, the process comprising condensing an alkylolurea containing between 2 and 6 carbon atoms in an alkylol radical with formaldehyde.

11. In the manufacture of resinous condensation products, the process comprising condensing an alkylolurea containing at least two carbon atoms in an alkylol radical with unsubstituted urea and with formaldehyde.

12. In the manufacture of resinous condensation products, the process comprising condensing a mixture of an alkylolurea containing between 2 and 6 carbon atoms in an alkylol radical and a compound chosen from the class consisting of urea and biuret with formaldehyde.

13. In the manufacture of resinous condensation products, the process comprising condensing an alkylolurea containing at least two carbon atoms in an alkylol radical with formaldehyde in the presence of an alcohol.

14. As a new composition of matter, the resinous condensation product obtained by condensing with formaldehyde a condensation product which has been obtained by condensing with urea an alkylol amine having at least two carbon atoms in an alkylol radical and having at least one hydrogen atom attached directly to the nitrogen atom.

15. In the manufacture of resinous condensation products, the process comprising condensing a mixture containing an alkylolurea having at least two carbon atoms in an alkylol radical and a compound chosen from the class consisting of urea and biruret with formaldehyde, in the presence of an alcohol.

16. A composition as defined by claim 14 in which the amine is a mono-alkylol amine.

17. A composition as defined by claim 14 in which the amine is a di-alkylol amine.

JOHN F. OLIN.